United States Patent
Turner et al.

(10) Patent No.: US 9,667,106 B2
(45) Date of Patent: May 30, 2017

(54) MOTOR HOUSING AND METHODS OF ASSEMBLING THE SAME

(71) Applicant: REGAL BELOIT AUSTRALIA PTY LTD., Rowville, VIC (AU)

(72) Inventors: Matthew John Turner, Melbourne (AU); Greg Heins, Melbourne (AU); Byron Kennedy, Bonbeach (AU)

(73) Assignee: REGAL BELOIT AUSTRALIA PTY LTD, Rowville (AU)

( * ) Notice: Subject to any disclaimer, the term of this patent is extended or adjusted under 35 U.S.C. 154(b) by 854 days.

(21) Appl. No.: 14/036,192

(22) Filed: Sep. 25, 2013

(65) Prior Publication Data

US 2015/0084477 A1   Mar. 26, 2015

(51) Int. Cl.
| | |
|---|---|
| *H02K 5/15* | (2006.01) |
| *H02K 1/18* | (2006.01) |
| *H02K 21/24* | (2006.01) |
| *H02K 5/04* | (2006.01) |
| *H02K 9/22* | (2006.01) |
| H02K 5/173 | (2006.01) |
| H02K 15/00 | (2006.01) |

(52) U.S. Cl.
CPC .............. *H02K 1/182* (2013.01); *H02K 5/04* (2013.01); *H02K 9/22* (2013.01); *H02K 21/24* (2013.01); *H02K 5/1735* (2013.01); *H02K 15/00* (2013.01); *Y10T 29/49009* (2015.01)

(58) Field of Classification Search
CPC ......... F02D 29/048; H02K 1/182; H02K 5/04
USPC ......... 310/216.113, 89, 156.32–156.37, 268, 310/202, 203
See application file for complete search history.

(56) References Cited

U.S. PATENT DOCUMENTS

| | | | |
|---|---|---|---|
| 5,880,551 A | * | 3/1999 | Prudham ................. G01R 7/06 |
| | | | 310/156.43 |
| 6,188,159 B1 | | 2/2001 | Fan |
| 6,853,107 B2 | | 2/2005 | Pyntikov et al. |

(Continued)

FOREIGN PATENT DOCUMENTS

| | | |
|---|---|---|
| EP | 0936671 A1 | 8/1999 |
| WO | 2014 138816 A1 | 9/2014 |

OTHER PUBLICATIONS

European Extended Search Report, Application No. 14848806.7, dated Jul. 13, 2016, pp. 6.

(Continued)

*Primary Examiner* — Terrance Kenerly
(74) *Attorney, Agent, or Firm* — Armstrong Teasdale LLP

(57) ABSTRACT

A motor housing for enclosing a first stator module and a second stator module of a motor is provided. The motor housing includes a stator housing. The stator housing has a first module portion coupled to the first stator module, wherein the first module has a first contoured shape complimentary to the first stator module. A second module portion is coupled to the second stator module, wherein the second module has a second contoured shape complimentary to the second stator module. The housing also includes a base portion having a first side coupled to the first module portion and a second side coupled to the second module portion. The base portion further includes a third side coupled to and extends between the first side and the second side. A rotor housing is coupled to the stator housing and has a fastener coupled to the third side.

20 Claims, 12 Drawing Sheets

(56) References Cited

U.S. PATENT DOCUMENTS

| | | | | |
|---|---|---|---|---|
| 7,876,008 B2* | 1/2011 | Yoshida | ............... | H02K 3/522 |
| | | | | 310/216.115 |
| 8,373,326 B2* | 2/2013 | Enomoto | ............... | H02K 1/148 |
| | | | | 310/156.32 |
| 8,502,426 B2* | 8/2013 | Loussert | ............... | H02K 29/08 |
| | | | | 310/156.05 |
| 9,318,938 B2* | 4/2016 | Carpenter | ............... | H02K 5/20 |
| 2003/0057796 A1* | 3/2003 | Fan | ............... | H02K 1/148 |
| | | | | 310/216.062 |
| 2004/0007935 A1 | 1/2004 | Kimura et al. | | |
| 2007/0152523 A1* | 7/2007 | Bookout | ............... | H02K 5/00 |
| | | | | 310/87 |
| 2008/0115345 A1 | 5/2008 | Purvines et al. | | |
| 2008/0122303 A1 | 5/2008 | Santo et al. | | |
| 2011/0204743 A1* | 8/2011 | Meier | ............... | H02K 1/148 |
| | | | | 310/216.008 |
| 2011/0309694 A1* | 12/2011 | Woolmer | ............... | H02K 21/24 |
| | | | | 310/44 |
| 2011/0309699 A1 | 12/2011 | Woolmer et al. | | |
| 2012/0218710 A1 | 8/2012 | Ioannidis | | |
| 2013/0147292 A1 | 6/2013 | Lee et al. | | |
| 2013/0181550 A1* | 7/2013 | Li | ............... | H02K 3/522 |
| | | | | 310/43 |

OTHER PUBLICATIONS

International Search Report and Written Opinion issued in International Application No. PCT/AU2014/000906, mailed Oct. 17, 2014.
Zhu, "Fractional Slot Permanent Magnet Brushless Machines and Drives for Electric and Hybrid Propulsion Systems," EVER (Ecologic Vehicles : Renewable Energies), Mar. 26-29, 2009, pp. 11.

* cited by examiner

1

MOTOR HOUSING AND METHODS OF ASSEMBLING THE SAME

BACKGROUND OF THE INVENTION

The embodiments described herein relate generally to electrical machines, and more particularly, to axial flux electric motors having a modular stator housing.

One of many applications for an electric motor is to operate a fan for an air conditioning unit. The electric motor may also be configured to operate a compressor and/or an evaporator. Many air conditioning units include indoor air conditioning units, outdoor air conditioning units, wall mounted split air conditioning units and ductless air conditioning units.

A common type of motor that may be used in the applications described above is an electronically commutated motor (ECM). ECMs may include, but are not limited to, brushless direct current (BLDC) motors, permanent magnet alternating current (PMAC) motors, split RAC motors, and variable reluctance motors. Some ECMs have an axial flux configuration in which the flux in the air gap extends in a direction parallel to the axis of rotation of the rotor.

Some ECM motors include a polymer encapsulated housing which couples to a stator module of the motor. The polymer encapsulated housing increases mechanical strength, electrical isolation and/or environmental access for the motor. Conventional polymer encapsulated housings, however, may inhibit heat transfer from the stator modules and into the surrounding environment. More particularly, some housings may increase the surface area of polymer materials surrounding heat generating stators which may reduce motor cooling. Reduced motor cooling may decrease power density, decrease motor efficiency and increase motor operating costs.

BRIEF DESCRIPTION OF THE INVENTION

A motor housing for enclosing a first stator module and a second stator module of a motor is provided. The motor housing includes a stator housing having a first module portion coupled to the first stator module, wherein the first module has a first contoured shape complimentary to the first stator module. A second module portion is coupled to the second stator module, wherein the second module has a second contoured shape complimentary to the second stator module. The housing also includes a base portion having a first side coupled to the first module portion and a second side coupled to the second module portion. The base portion further includes a third side coupled to and extends between the first side and the second side. A rotor housing is coupled to the stator housing and has a fastener coupled to the third side.

A motor having an axis of rotation is provided. The motor includes a stator having a first stator module and a second stator module and a rotor coupled to the stator. A motor shaft is coupled to the rotor along the axis of rotation. The motor also includes a stator housing coupled to the stator. The stator housing has a first module portion coupled to the first stator module, wherein the first module has a first contoured shape complimentary to the first stator module. A second module portion is coupled to the second stator module, wherein the second module has a second contoured shape complimentary to the second stator module. A base portion having a first side is coupled to the first module portion and a second side is coupled to the second module portion. The base portion further includes a third side coupled to and extends between the first side and the second side.

A method of assembling a motor housing for enclosing a first stator module and a second stator module is provided. The method includes coupling a first module portion to the first stator module, wherein the first module portion has a first contoured shape complimentary to the first stator module. The method also includes coupling a second module portion to the second stator module, wherein the second module portion has a second contoured shape complimentary to the second stator module. A base portion is provided between the first module portion and the second module portion. The method further includes coupling a rotor housing to the base portion.

DETAILED DESCRIPTION OF THE INVENTION

The embodiments described herein relate to housings for electrical machines and methods of assembling the housing. The embodiments relate to a stator housing that is coupled to the electrical machine. More particularly, the embodiments relate to a stator housing that includes contoured profile shapes complimentary to stator modules to reduce a wall thickness of the stator housing around heat generating components of the stator modules. It should be understood that the embodiments described herein for electrical machines are not limited to axial flux machines, and further understood that the descriptions and figures are exemplary only. Specifically, the embodiments may generally be used in any suitable article for which heat is transferred for cooling the article and/or for maintaining a temperature of the article.

Figure 1:
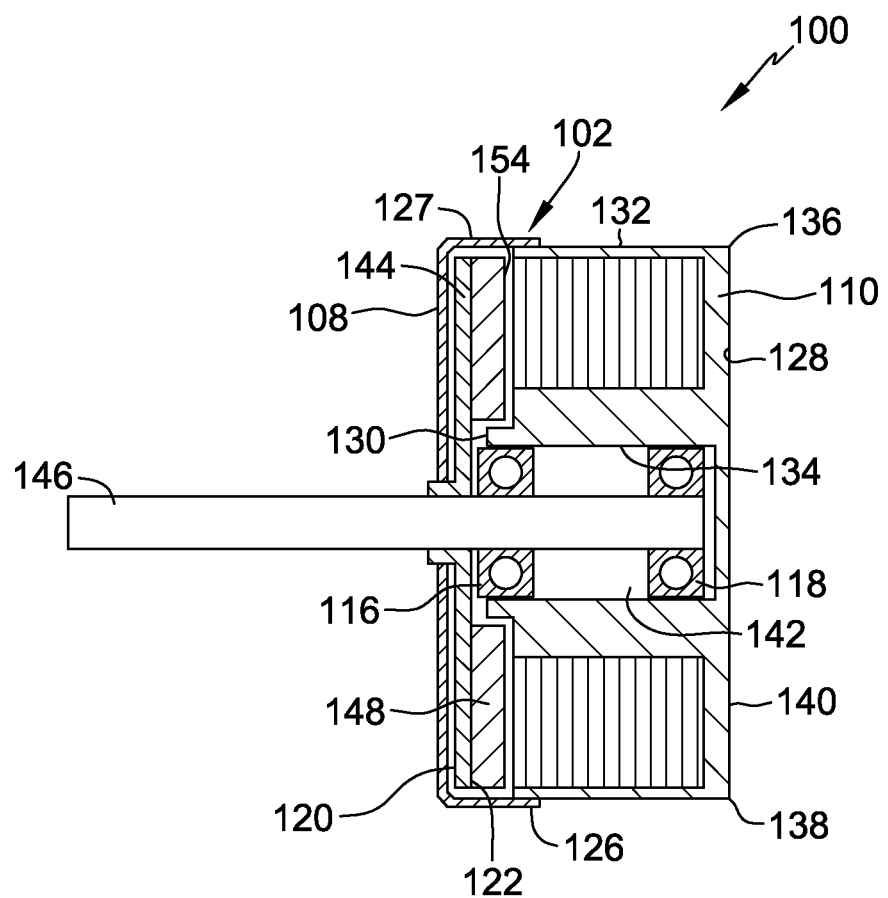
FIG. 1 is a cross-sectional view of an exemplary electrical machine.
Figure 2:
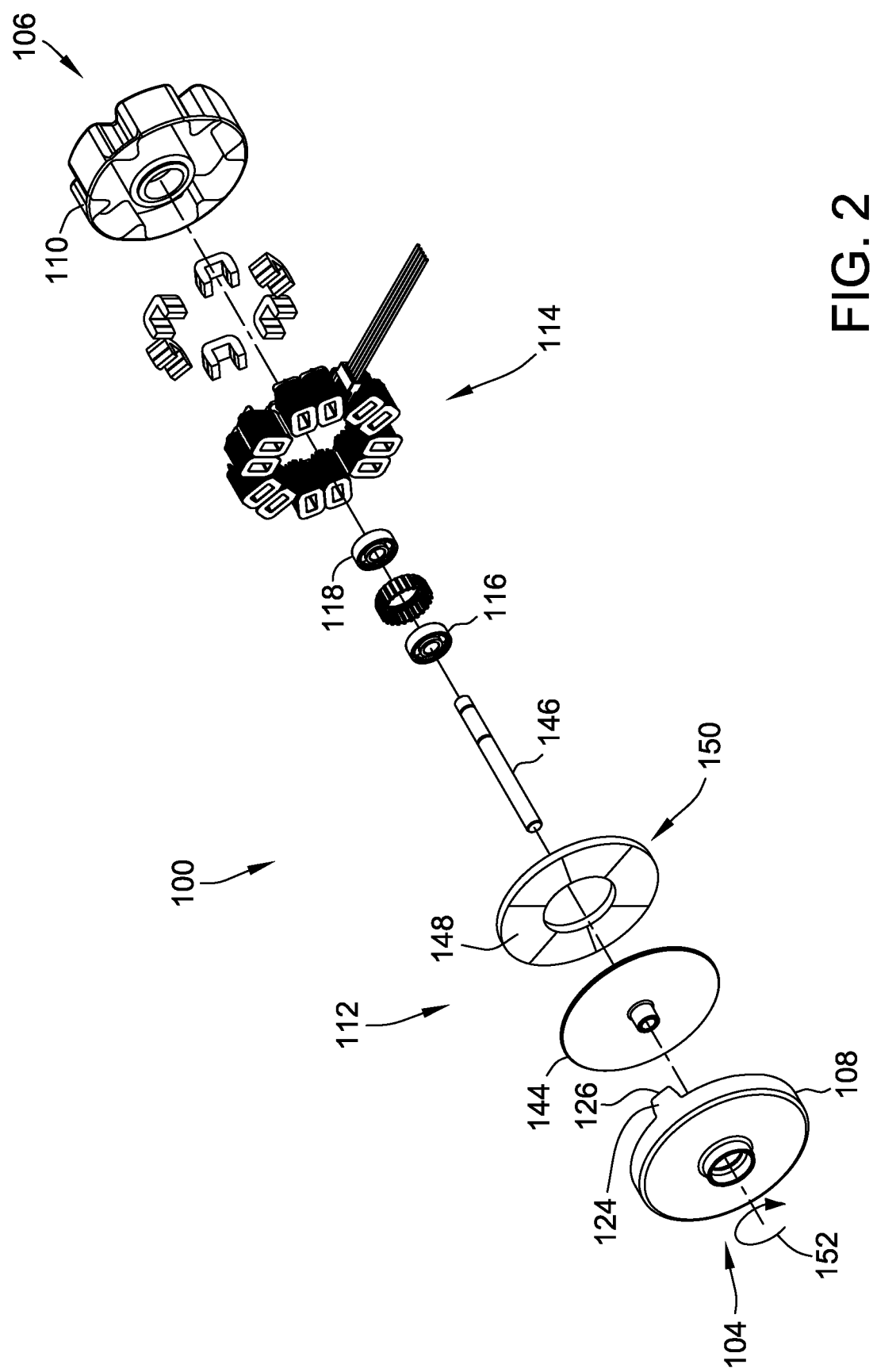
FIG. 2 is an exploded view of the electrical machine shown in FIG. 1.

FIG. 1 is a cross-sectional view of an exemplary axial flux electrical machine 100. FIG. 2 is an exploded view of electrical machine 100. In the exemplary embodiment, electrical machine 100 is an electric motor having a housing 102 which includes a first end 104 and a second end 106. Electric motor 100 may be coupled to an indoor split air conditioning unit (not shown). Moreover, electrical machine 100 may operate as an electric generator. Electrical machine 100 includes a rotor housing 108, a stator housing 110, a rotor assembly 112, a stator assembly 114, a first bearing assembly 116, and a second bearing assembly 118.

Rotor housing 108 includes a rotor outer side 120, a rotor inner side 122 and at least one rotor fastener 124 coupled to stator housing 110. In one embodiment, fastener 124 includes a first clip 126 and a second clip (not shown) configured to couple to stator housing 110 as described herein. First clip 126 and second clip (not shown) are coupled to rotor housing 108 and spaced apart from each other about 180° with respect to rotor housing 108. First clip 126 and second clip (not shown) can be coupled at any location to rotor housing 108. Stator housing 110 includes a stator outer side 128 and a stator inner side 130. Moreover, stator housing 110 includes a stator outer surface 132 and a stator inner surface 134 between stator outer side 128 and stator inner side 130.

Stator outer surface 132 includes a first end 136, a second end 138, and a continuous, flat surface 140 coupled to and extends between first end 136 and second end 138. Stator inner surface 134 provides a bore 142 around a shaft 146. In the exemplary embodiment, first bearing assembly 116 and second bearing assembly 118 are coupled to stator inner surface 134 and located within stator outer side 128 and stator inner side 130 and between stator outer side 128 and stator inner side 130. Since first bearing assembly 116 and second bearing assembly 118 are coupled to stator inner surface 134, stator housing 110 facilitates reducing an axial length of electrical machine 100. More particularly, the positions of first bearing assembly 116 and second bearing assembly 118 between stator outer side 128 and stator inner side 130 eliminates external bearing housings (not shown).

In the exemplary embodiment, rotor assembly 112 includes a rotor 144 coupled to shaft 146, and a plurality of permanent magnets 148 are coupled to rotor 144. Permanent magnets 148 are fabricated from neodymium and are formed as an annular magnet 150 with alternating magnetized segments. However, any suitable permanent magnet shape and material may be used that enables electrical machine 100 to function as described herein. Rotor assembly 112 is rotatable within rotor housing 108, and more specifically, rotatable within first bearing assembly 116 and second bearing assembly 118 about an axis of rotation 152.

In the exemplary embodiment, rotor assembly 112 is driven by an electronic control (not shown), for example, a sinusoidal or trapezoidal electronic control. In the exemplary embodiment, rotor 144 is manufactured using a sintering process from, for example, Soft Magnetic Alloy (SMA) or Soft Magnetic Composite (SMC) materials. Alternatively, rotor 144 is machined and/or cast from any suitable material, for example, steel. An air gap 154 is formed between rotor inner side 122 and stator inner side 130, and a magnetic flux within machine 100 extends between permanent magnets 148 and stator assembly 114 in a direction parallel to axis of rotation 152.

Figure 3:
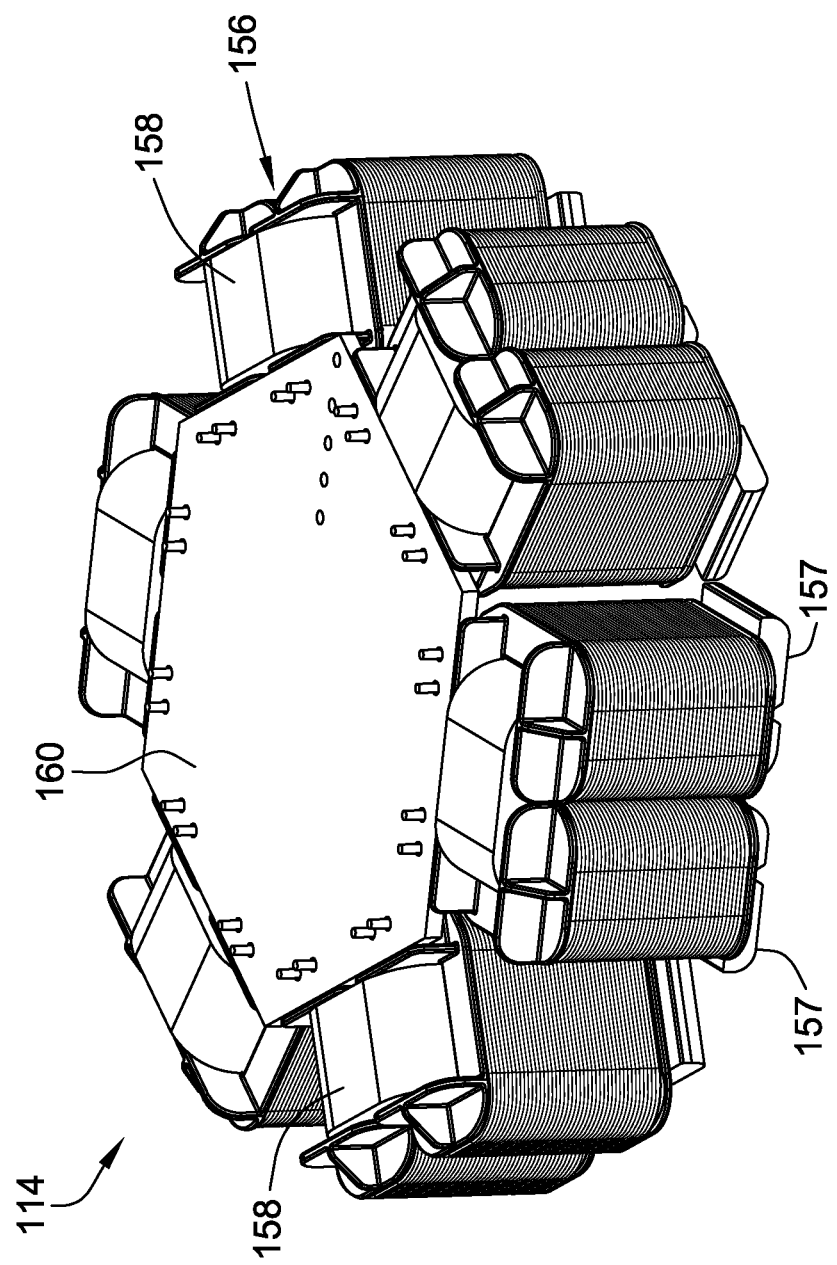
FIG. 3 is a perspective view of an exemplary embodiment of stator assembly 114.
Figure 4:
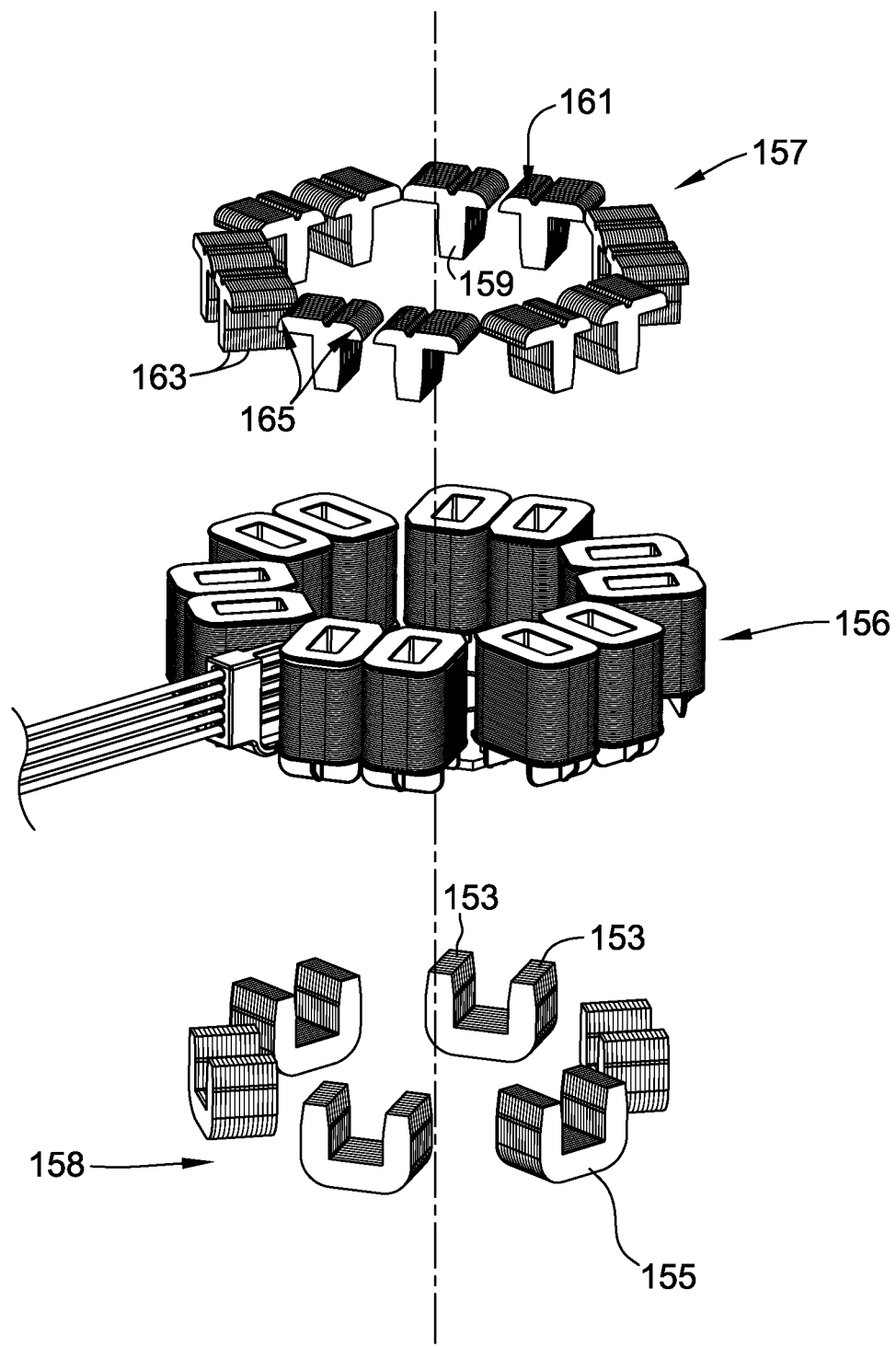
FIG. 4 is an exploded view of stator assembly 114 shown in FIG. 3.
Figure 5:
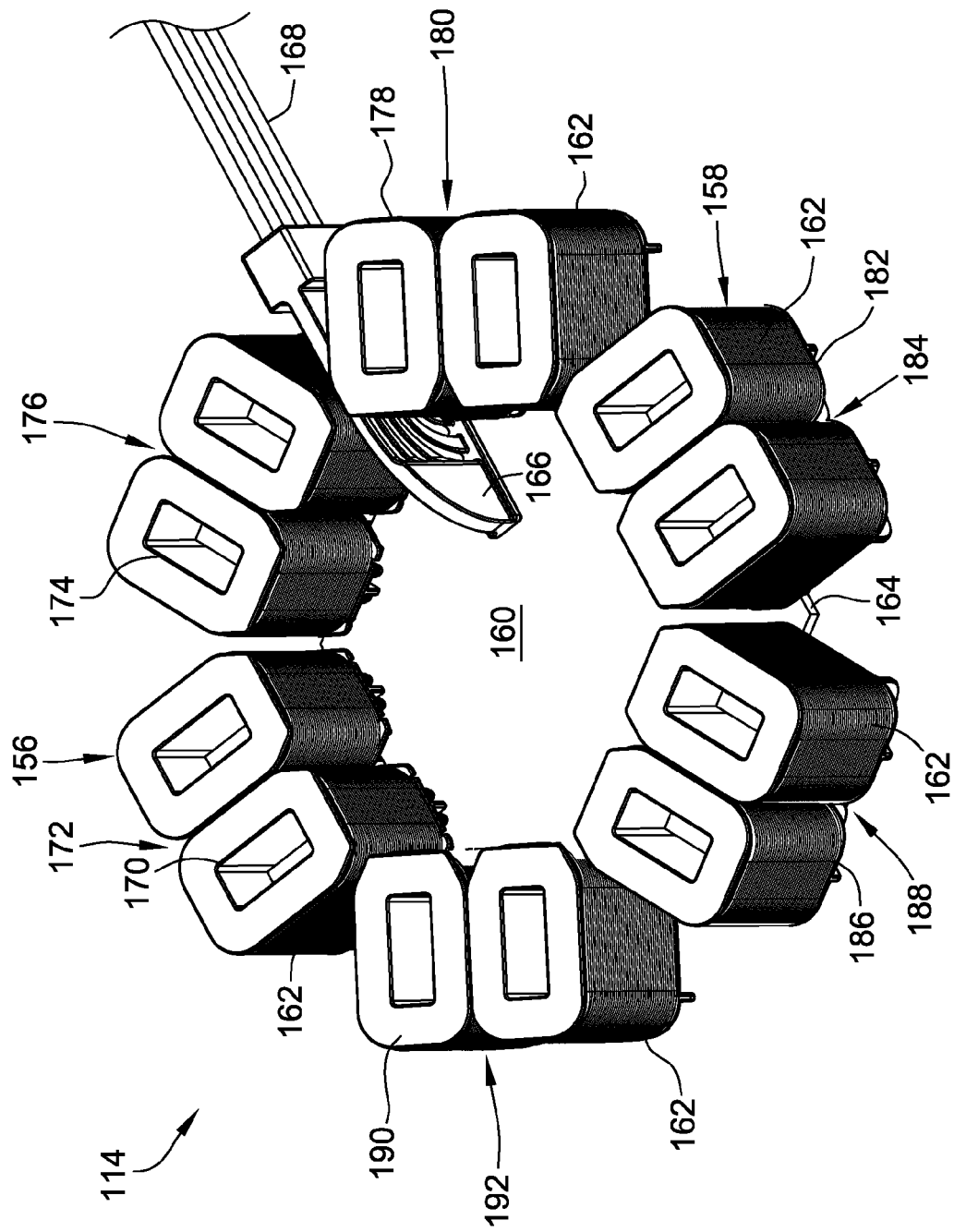
FIG. 5 is another perspective view of stator assembly 114.

FIG. 3 is a perspective view of an exemplary embodiment of stator assembly 114. FIG. 4 is an exploded view of stator assembly 114. FIG. 5 is another perspective view of stator assembly 114. In the exemplary embodiment, stator assembly 114 is a multi-phase axial flux stator, and is preferably a three-phase axial flux stator producing flux in the axial direction (such as, parallel to axis of rotation 152). Stator assembly 114 generally includes a bobbin assembly 156 having a plurality of stator modules 158 and a control board 160. Stator modules 114 are generally C-shaped and include a pair of teeth 153 connected by a yoke section 155. In the exemplary embodiment, stator modules 114 are orientated in a general axial direction such that teeth 153 extend substantially parallel to axis of rotation 152 (shown in FIG. 2). Each stator module 158 includes a plurality of stacked lamination sheets 162 circumferentially coupled to and arranged about an outer edge 164 of control board 160. Such a construction simplifies the manufacturing process and enables modular stator modules 158 to be produced quickly and efficiently.

In the exemplary embodiment, tooth tips 157 are generally T-shaped and include an axial member 159 and a cross member 161. Tooth tips 157 are fabricated from a plurality of stacked lamination sheets 163. Such a construction simplifies the manufacturing process and enables modular tooth tips 157 to be produced quickly and efficiently. Tooth tips 157 also include rounded portions 165 to reduce noise by reducing harmonic content of the back electromagnetic field (EMF) and cogging torque. Tooth tips 157 are generally aligned with a corresponding tooth 153 and increase flux density in stator assembly 114. A wire connector 166 is coupled to control board 160 and includes a plurality of control wires 168 coupled to electronic control (not shown).

In the exemplary embodiment, the plurality of stator modules 158 includes a first stator module 170 having a first pair 172 of stacked lamination sheets 162, a second stator module 174 having a second pair 176 of stacked lamination sheets 162, a third stator module 178 having a third pair 180 of stacked lamination sheets 162, a fourth stator module 182 having a fourth pair 184 of stacked lamination sheets 162, a fifth stator module 186 having a fifth pair 188 of stacked lamination sheets 162, and a sixth stator module 190 having a sixth pair 192 of stacked lamination sheets 162. Although six pairs of lamination sheets 162 are illustrated, stator modules 158 may include any number of pairs of lamination sheets 162 that enable electrical machine 100 to function as described herein.

Figure 6:
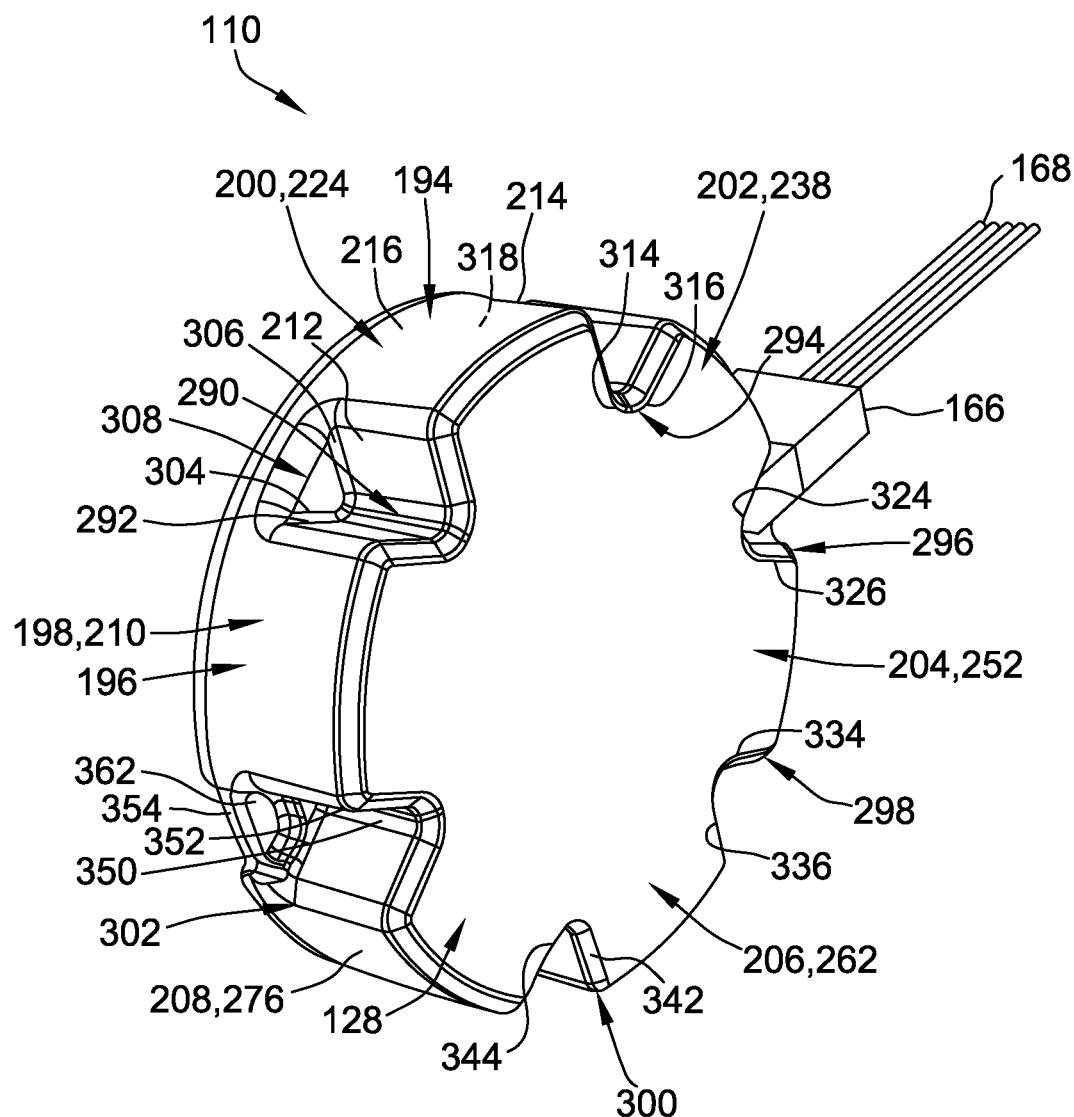
FIG. 6 is a perspective view of an exemplary stator housing that is coupled to the stator modules shown in FIG. 3.
Figure 7:
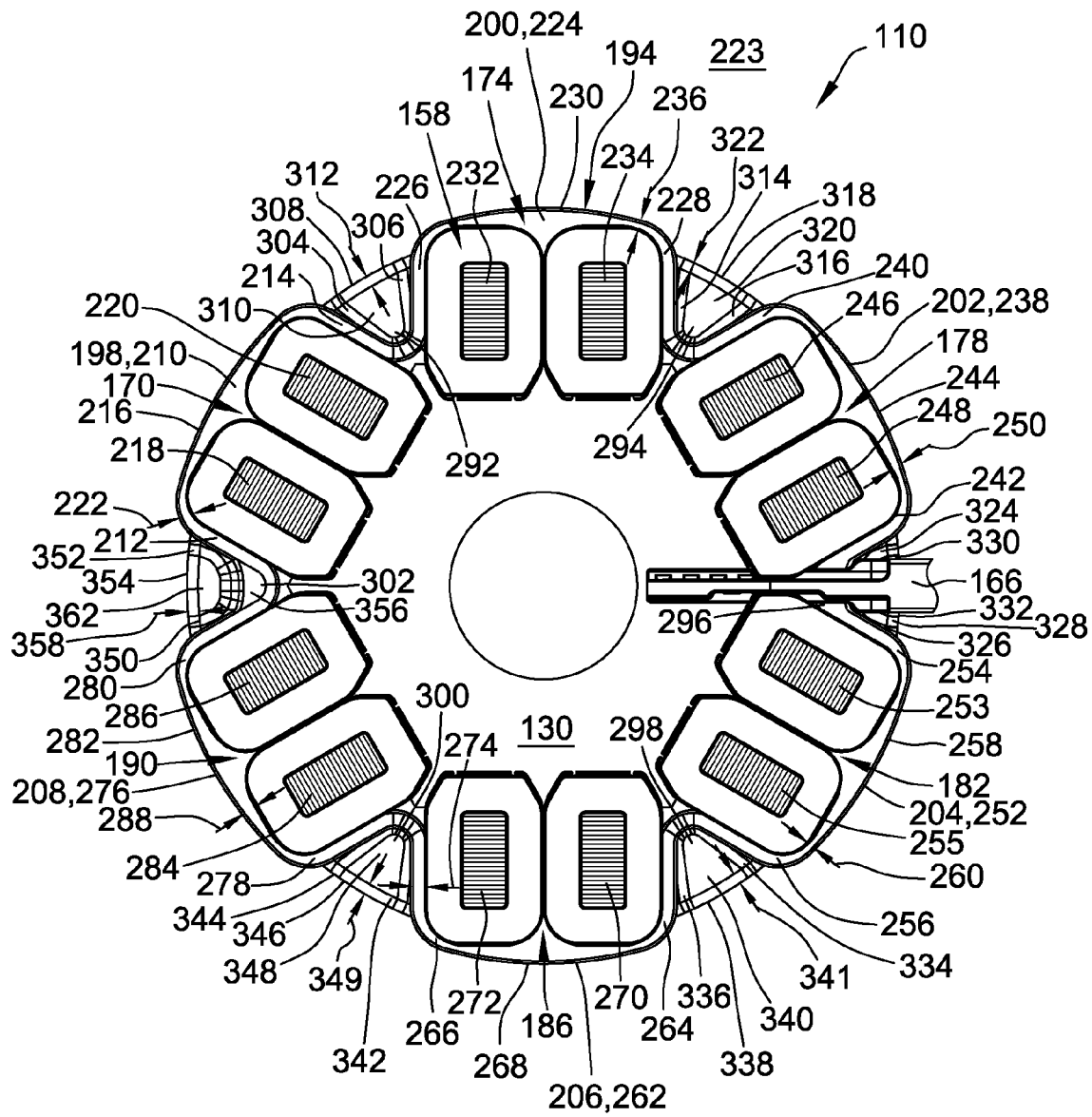
FIG. 7 is a cross-sectional view of the stator housing and the electrical machine shown in FIG. 6.

FIG. 6 is a perspective view of stator housing 110 coupled to stator modules 158 (shown in FIG. 3). FIG. 7 is a cross-sectional view of stator housing 110 and stator modules 158. Stator housing 110 includes a plurality of module portions 194 which are configured to enclose the plurality of stator modules 158. Module portions 194 are coupled to and extends between stator outer side 128 and stator inner side 130 and are circumferentially arranged about stator housing 110. Module portions 194 include a resin material 196, and in particular, a polymer resin having high strength, rigidity and temperature properties. In the exemplary embodiment, the plurality of module portions 194 include a first module portion 198, a second module portion 200, a third module portion 202, a fourth module portion 204, a fifth module portion 206, and a sixth module portion 208. Although six module portions 194 are illustrated, module portions 194 may include any number of portions that enable electrical machine 100 to function as described herein.

First module portion 198 has a first contoured shape 210 complimentary to first stator module 170 and is coupled to first stator module 170. In the exemplary embodiment, first contoured shape 210 is a substantially rectangular shaped. Alternatively, first contoured shape 210 may include other shapes such as, but not limited to, square, oval, and circular shapes. First contoured shape 210 may include any shape that contours and/or matches a shape of first stator module 170. First contoured shape 210 includes a first module side 212, a second module side 214, and a module end 216 coupled to and extends between first module side 212 and second module side 214.

First module side 212 is coupled to a first laminate stack 218, second module side 214 is coupled to a second laminate stack 220 and module end 216 is coupled to first laminate stack 218 and second laminate stack 220. First module side 212, second module side 214, and module end 216 each have wall thickness 222 from about 0.1 millimeters (mm) (0.0004 inches (in.)) to about 5 mm (0.2 in.). More particularly, first module side 212, second module side 214, and module end 216 each have a wall thickness 222 from about 0.5 mm (0.02 in.) to about 2 mm (0.08 in.). Wall thickness 222 is sized and configured to minimize resin material 196 and to facilitate increasing heat transfer from first laminate stack 218 and second laminate stack 220 to surrounding environment 223.

Second module portion 200 has a second contoured shape 224 complimentary to second stator module 174 and is coupled to second stator module 174. In the exemplary embodiment, second contoured shape 224 is a substantially rectangular shaped. Alternatively, second contoured shape 224 may include other shapes such as, but not limited to, square, oval, and circular shapes. Second contoured shape 224 may include any shape that contours and/or matches a shape of second stator module 174. Second contoured shape 224 includes a first module side 226, a second module side 228, and a module end 230 coupled to and extends between first module side 226 and second module side 228.

First module side 226 is coupled to a first laminate stack 232, second module side 228 is coupled to a second laminate stack 234 and module end 230 is coupled to first laminate stack 232 and second laminate stack 234. First module side 226, second module side 228, and module end 230 each have a wall thickness 236 from about 0.1 mm (0.0004 in.) to about 5 mm (0.2 in.). More particularly, first module side 226, second module side 228, and module end 230 each have wall thickness 236 from about 0.5 mm (0.02 in.) to about 2 mm (0.08 in.). Wall thickness 236 is sized and configured to minimize resin material 196 and to facilitate increasing heat transfer from first laminate stack 232 and second laminate stack 234 and to surrounding environment 223.

Third module portion 202 has a third contoured shape 238 complimentary to third stator module 178 and is coupled to third stator module 178. In the exemplary embodiment, third contoured shape 238 is a substantially rectangular shaped. Alternatively, third contoured shape 238 may include other shapes such as, but not limited to, square, oval, and circular shapes. Third contoured shape 238 may include any shape that contours and/or matches a shape of third stator module 178. Third contoured shape 238 includes a first module side 240, a second module side 242, and a module end 244 coupled to and extends between first module side 240 and second module side 242.

First module side 240 is coupled to a first laminate stack 246, second module side 242 is coupled to a second laminate stack 248 and module end 244 is coupled to first laminate stack 246 and second laminate stack 248. First module side 240, second module side 242, and module end 244 each have a wall thickness 250 from about 0.1 mm (0.0004 in.) to about 5 mm (0.2 in.). More particularly, first module side 240, second module side 242, and module end 244 each have wall thickness 250 from about 0.5 mm (0.02 in.) to about 2 mm (0.08 in.). Wall thickness 250 is sized and configured to minimize material 196 and to facilitate increasing heat transfer from first laminate stack 246 and second laminate stack 248 and to surrounding environment 223.

Fourth module portion 204 has a fourth contoured shape 252 complimentary to fourth stator module 182 and is coupled to fourth stator module 182. In the exemplary embodiment, first contoured shape 210 is a substantially rectangular shaped. Alternatively, fourth contoured shape 252 may include other shapes such as, but not limited to, square, oval, and circular shapes. Fourth contoured shape 252 may include any shape that contours and/or matches a shape of fourth stator module 182. Fourth contoured shape 252 includes a first module side 254, a second module side 256, and a module end 258 coupled to and extends between first module side 254 and second module side 256.

First module side 254 is coupled to a first laminate stack 253, second module side 256 is coupled to a second laminate stack 255 and module end 258 is coupled to first laminate stack 253 and second laminate stack 255. First module side 254, second module side 256, and module end 258 each have a wall thickness 260 from about 0.1 mm (0.0004 in.) to about 5 mm (0.2 in.). More particularly, first module side 254, second module side 256, and module end 258 each have wall thickness 260 from about 0.5 mm (0.02 in.) to about 2 mm (0.08 in.). Wall thickness 260 is sized and configured to minimize material 196 and to facilitate increasing heat transfer from first laminate stack 253 and second laminate stack 255 and to surrounding environment 223.

Fifth module portion 206 has a fifth contoured shape 262 complimentary to fifth stator module 186 and is coupled to fifth stator module 186. In the exemplary embodiment, fifth contoured shape 262 is a substantially rectangular shaped. Alternatively, fifth contoured shape 262 may include other shapes such as, but not limited to, square, oval, and circular shapes. Fifth contoured shape 262 may include any shape that contours and/or matches a shape of fifth stator module 186. Fifth contoured shape 262 includes a first module side 264, a second module side 266, and a module end 268 coupled to and extends between first module side 264 and second module side 266.

First module side 264 is coupled to a first laminate stack 270, second module side 266 is coupled to a second laminate stack 272 and module end 268 is coupled to first laminate stack 270 and second laminate stack 272. First module side 264, second module side 266, and module end 268 each have a wall thickness 274 from about 0.1 mm (0.0004 in.) to about 5 mm (0.2 in.). More particularly, first module side 264, second module side 266, and module end 268 each have wall thickness 274 from about 0.5 mm (0.02 in.) to about 2 mm (0.08 in.). Wall thickness 274 is sized and configured to minimize resin material 196 and to facilitate increasing heat transfer from first laminate stack 270 and second laminate stack 272 and to surrounding environment 223.

Sixth module portion 208 has a sixth contoured shape 276 complimentary to sixth stator module 190 and is coupled to sixth stator module 190. In the exemplary embodiment, sixth contoured shape 276 is a substantially rectangular shaped. Alternatively, sixth contoured shape 276 may include other shapes such as, but not limited to, square, oval, and circular shapes. Sixth contoured shape 276 may include any shape that contours and/or matches a shape of first stator module 170. Sixth contoured shape 276 includes a first module side 278, a second module side 280, and a module end 282 coupled to and extends between first module side 278 and second module side 280.

First module side 278 is coupled to a first laminate stack 284, second module side 280 is coupled to a second laminate stack 286 and module end 282 is coupled to first laminate stack 284 and second laminate stack 286. First module side 278, second module side 280, and module end 282 each have a wall thickness 288 from about 0.1 mm (0.0004 in.) to about 5 mm (0.2 in.). More particularly, first module side 278, second module side 280, and surface 280 each have wall thickness 288 from about 0.5 mm (0.02 in.) to about 2 mm (0.08 in.). Wall thickness 288 is sized and configured to minimize resin material 196 and to facilitate increasing heat transfer from first laminate stack 284 and second laminate stack 286 and into surrounding environment 223.

Stator housing 110 further includes a plurality of base portions 290 coupled to the plurality of module portions 194. Base portions 290 are circumferentially arranged around stator housing 110 and are configured to enclose the plurality of stator modules 158. Moreover, base portions 290 are located between adjacent module portions 194 to facilitate forming a plurality of indentations 291 within stator housing 110 and between adjacent module portions 194. Base portions 290 include resin material 196, and in particular, a polymer resin having high strength, rigidity and temperature properties. In the exemplary embodiment, the plurality of base portions 290 includes a first base portion 292, a second base portion 294, a third base portion 296, a fourth base portion 298, a fifth base portion 300, and a sixth base portion 302. Although six base portions 290 are illustrated, base portions 290 may include any number of portions that enable electrical machine 100 to function as described herein.

First base portion 292 includes a first base side 304, a second base side 306, and a third base side 308 coupled to and extends between first base side 304 and second base side 306. First base side 304 is coupled to second module side 214 of first module portion 198. Second base side 306 is coupled to first module side 226 of second module portion 200. Third base side 308 is also coupled to second module side 214 and first module side 226. In the exemplary embodiment, third base side 308 has a V-shape between first module side 226 and second module side 214. Alternatively, third base side 308 may include any shape to enable electrical machine 100 to function as described herein. Second module side 214, first module side 226, first base side 304, and second base side 306 define a first indentation area 310 with third base side 308 as an end of first indentation area 310. First base portion 292 and first indentation 310 are located between first module portion 198 and second module portion 200. Moreover, first base portion 292 is spaced from second base portion 294 by second module 200 and is spaced from sixth base portion 302 by sixth module portion 208.

In the exemplary embodiment, first base side 304 is integrally coupled to second module side 214 of first module portion 198; second base side 306 is integrally coupled to first module side 226 of second module portion 200; and, third base side 308 is integrally coupled to second module side 214 and first module side 226 by processes such as, for example, molding processes and/or press processes. Alternatively, first base side 304 may be coupled to second module side 214 of first module portion 198; second base side 306 may be coupled to first module side 226 of second module portion 200; and third base side 308 may be coupled to second module side 214 and first module side 226 by other means such as, for example, connecting portions (not shown) or seams (not shown).

First base side 304, second base side 306, and third base side 308 each have a wall thickness 312 from about 0.1 mm (0.0004 in.) to about 5 mm (0.2 in.). More particularly, first base side 304, second base side 306, and third base side 308 each have wall thickness 312 from about 0.5 mm (0.02 in.) to about 2 mm (0.08 in.). Wall thickness 312 is sized and configured to minimize resin material 196 and to facilitate increasing heat transfer from first laminate stack 232 and second laminate stack 220 and into surrounding environment 223. More particularly, wall thickness 312 is configured to transfer heat from first laminate stack 232 and second laminate stack 220 and to first indentation area 310 to facilitate cooling of stator modules 158.

Second base portion 294 includes a first base side 314, a second base side 316, and a third base side 318 coupled to and extends between first base side 314 and second base side 316. First base side 314 is coupled to second module side 228 of second module portion 200. Second base side 316 is coupled to first module side 240 of third module portion 202. Third base side 318 is also coupled to second module side 228 and first module side 240. In the exemplary embodiment, third base side 318 has a V-shape between first module side 240 and second module side 228. Alternatively, third base side 318 may include any shape to enable electrical machine 100 to function as described herein. Second module side 228, first module side 240, first base side 314, and second base side 316 define a second indentation area 320 with third base side 318 as an end of second indentation area 320. Second base portion 294 and second indentation area 320 are located between second module portion 2000 and third module portion 202. Moreover, second base portion 294 is spaced from third base portion 296 by third module portion 202 and is spaced from first base portion 292 by second module portion 200.

In the exemplary embodiment, first base side 314 is integrally coupled to second module side 228 of second module portion 200; second base side 316 is integrally coupled to first module side 240 of third module portion 202; and, third base side 318 is integrally coupled to second module side 228 and first module side 240 by processes such as, for example, molding processes and/or press processes. Alternatively, first base side 314 may coupled to second module side 228 of second module portion 200; second base side 316 may be coupled to first module side 240 of third module portion 202; and, third base side 318 may be coupled to second module side 228 and first module side 240 by other means such as, for example, connecting portions (not shown) or seams (not shown).

First base side 314, second base side 316, and third base side 318 each have a wall thickness 322 from about 0.1 mm (0.0004 in.) to about 5 mm (0.2 in.). More particularly, first base side 314, second base side 316, and third base side 318 each have wall thickness 322 from about 0.5 mm (0.02 in.) to about 2 mm (0.08 in.). Wall thickness 322 is sized and configured to minimize resin material 196 and to facilitate increasing heat transfer from first laminate stack 246 and second laminate stack 234 and into surrounding environment 223. More particularly, wall thickness 322 is configured to transfer heat from first laminate stack 246 and second laminate stack 234 and to second indentation area 320 to facilitate cooling of stator modules 158.

Third base portion 296 includes a first base side 324, a second base side 326, and a third base side 328 coupled to and extends between first base side 324 and second base side 326. First base side 324 is coupled to second module side 242 of third module portion 202. Second base side 326 is coupled to first module side 254 of fourth module portion 204. Third base side 328 is also coupled to second module side 242 and first module side 254. In the exemplary embodiment, third base side 328 has a V-shape between first module side 254 and second module side 242. Alternatively, third base side 328 may include any shape to enable electrical machine 100 to function as described herein. Second module side 242, first module side 254, first base side 324, and second base side 326 define a third indentation area 330 with third base side 328 as an end of third indentation area 330. Third base portion 296 and third indentation area 330 are located between third module portion 202 and fourth module portion 204. Moreover, third base portion 296 is spaced from second base portion 294 by third module portion 202 and is spaced from fourth base portion 298 by fourth module portion 204.

In the exemplary embodiment, first base side 324 is integrally coupled to second module side 242 of third module portion 202; second base side 326 is integrally coupled to first module side 254 of fourth module portion 204; and, third base side 328 is integrally coupled to second module side 242 and first module side 254 by processes such as, for example, molding processes and/or press processes. Alternatively, first base side 324 may be coupled to second module side 242 of third module portion 202; second base side 326 may be coupled to first module side 254 of fourth module portion 204; and, third base side 328 may be coupled to second module side 242 and first module side 254 by other means such as, for example, connecting portions (not shown) or seams (not shown).

First base side 324, second base side 326, and third base side 328 each have a wall thickness 332 from about 0.1 mm (0.0004 in.) to about 5 mm (0.2 in.). More particularly, first base side 324, second base side 326, and third base side 328 each have wall thickness 332 from about 0.5 mm (0.02 in.) to about 2 mm (0.08 in.). Wall thickness 332 is sized and configured to minimize resin material 196 and to facilitate increasing heat transfer from first laminate stack 253 and second laminate stack 248 and into surrounding environment 223. More particularly, wall thickness 332 is configured to transfer heat from first laminate stack 253 and second laminate stack 248 and to third indentation area 330 to facilitate cooling of stator modules 158.

Fourth base portion 298 includes a first base side 334, a second base side 336, and a third base side 338 coupled to and extends between first base side 334 and second base side 336. First base side 334 is coupled to second module side 256 of fourth module portion 204. Second base side 336 is coupled to first module side 264 of fifth module portion 206. Third base side 338 is also coupled to second module side 256 and first module side 264. In the exemplary embodiment, third base side 338 has a V-shape between first module side 264 and second module side 256. Alternatively, third base side 338 may include any shape to enable electrical machine 100 to function as described herein. Second module side 256, first module side 264, first base side 334, and second base side 336 side define a fourth indentation area 340 with third base side 338 as an end of fourth indentation area 340. Fourth base portion 298 and fourth indentation area 340 are located between fourth module portion 204 and fifth module portion 206. Moreover, fourth base portion 298 is spaced from third base portion 296 by fourth module portion 204 and is spaced from fifth base portion 300 by fifth module portion 206.

In the exemplary embodiment, first base side 334 is integrally coupled to second module side 256 of fourth module portion 204; second base side 336 is integrally coupled to first module side 264 of fifth module portion 206; and, third base side 338 is integrally coupled to second module side 256 and first module side 264 by processes such as, for example, molding processes and/or press processes. Alternatively, first base side 334 may be coupled to second module side 256 of fourth module portion 204; second base side 336 may be coupled to first module side 264 of fifth module portion 206; and, third base side 338 may be coupled to second module side 256 and first module side 264 by other means such as, for example, connecting portions (not shown) or seams (not shown).

First base side 334, second base side 336, and third base side 338 each have a wall thickness 341 from about 0.1 mm (0.0004 in.) to about 5 mm (0.2 in.). More particularly, first base side 334, second base side 336, and third base side 338 each have wall thickness 341 from about 0.5 mm (0.02 in.) to about 2 mm (0.08 in.). Wall thickness 341 is sized and configured to minimize resin material 196 and to facilitate increasing heat transfer from first laminate stack 270 and second laminate stack 255 and into surrounding environment 223. More particularly, wall thickness 341 is configured to transfer heat from first laminate stack 270 and second laminate stack 255 and to fourth indentation area 340 to facilitate cooling of stator modules 158.

Fifth base portion 300 includes a first base side 342, a second base side 344, and a third base side 346 coupled to and extends between first base side 342 and second base side 344. First base side 342 is coupled to second module side 266 of fifth module portion 206. Second base side 344 is coupled to first module side 278 of sixth module portion 208. Third base side 346 is also coupled to second module side 266 and first module side 278. In the exemplary embodiment, third base side 346 has a V-shape between first module side 278 and second module side 266. Alternatively, third base side 396 may include any shape to enable electrical machine 100 to function as described herein. Second module side 266, first module side 278, first base side 342, and second base side 344 define a fifth indentation area 348 with third base side 346 as an end of fifth indentation area 348. Fifth base portion 300 and fifth indentation area 348 are located between fifth module portion 206 and sixth module portion 208. Moreover, fifth base portion 300 is spaced from fourth base portion 298 by fifth module 206 and is spaced from sixth base portion 302 by sixth module portion 208.

In the exemplary embodiment, first base side 342 is integrally coupled to second module side 266 of fifth module portion 206; second base side 344 is integrally coupled to first module side 278 of sixth module portion 208; third base side 346 is integrally coupled to second module side 266 and first module side 278 by processes such as, for example, molding processes and/or press processes. Alternatively, first base side 342 may be coupled to second module side 266 of fifth module portion 206; second base side 344 may be coupled to first module side 278 of sixth module portion 208; third base side 346 may be coupled to second module side 266 and first module side 278 by other means such as, for example, connecting portions (not shown) or seams (not shown).

First base side 342, second base side 344, and third base side 346 each have wall thickness 349 from about 0.1 mm (0.0004 in.) to about 5 mm (0.2 in.). More particularly, first base side 342, second base side 344, and third base side 346 each have wall thickness 349 from 0.5 mm (0.02 in.) to about 2 mm (0.08 in.). Wall thickness 349 is sized and configured to minimize resin material 196 and to facilitate increasing heat transfer from first laminate stack 284 and second laminate stack 272 and into surrounding environment 223. More particularly, wall thickness 349 is configured to transfer heat from first laminate stack 284 and second laminate stack 272 and to fifth indentation area 348 to facilitate cooling of stator modules 158.

Sixth base portion 302 includes a first base side 350, a second base side 352, and a third base side 354 coupled to and extends between first base side 350 and second base side 352. First base side 350 is coupled to second module side 280 of sixth module portion 208. Second base side 352 is coupled to first module side 212 of first module portion 198. Third base side 354 is also coupled to second module side 280 and first module side 212. In the exemplary embodiment, third base side 354 has a V-shape between first module side 212 and second module side 280. Alternatively, third base side 354 may include any shape to enable electrical machine 100 to function as described herein. Second module side 280, first module side 212, first base side 350, and second base side 352 define a sixth indentation area 356 with third base side 354 as an end of sixth indentation area 356. Sixth base portion 302 and sixth indentation area 356 are located between sixth module portion 208 and first module portion 198. Moreover, sixth base portion 302 is spaced from fifth base portion by sixth module portion 208 and is spaced from first base portion 292 by first module portion 198.

In the exemplary embodiment, first base side 350 is integrally coupled to second module side 280 of sixth module portion 208; second base side 352 is integrally coupled to first module side 212 of first module portion 198; and, third base side 354 is integrally coupled to second module side 280 and first module side 212 by processes such as, for example, molding processes and/or press processes. Alternatively first base side 350 may be coupled to second module side 280 of sixth module portion 208; second base side 352 may be coupled to first module side 212 of first module portion 198; and, third base side 354 may be coupled to second module side 280 and first module side 212 by other means such as, for example, connecting portions (not shown) or seams (not shown).

First base side 350, second base side 352, and third base side 354 each have a wall thickness 358 from about 0.1 mm (0.0004 in.) to about 5 mm (0.2 in.). More particularly, first base side 350, second base side 352, and third base side 354 each have wall thickness 358 from about 0.5 mm (0.02 in.) to about 2 mm (0.08 in.). Wall thickness 358 is sized and configured to minimize resin material 196 and to facilitate increasing heat transfer from first laminate stack 218 and second laminate stack 286 and into surrounding environment 223. More particularly, wall thickness 358 is configured to transfer heat from first laminate stack 218 and second laminate stack 286 and to sixth indentation area 356 to facilitate cooling of stator modules 158.

Third base side 328 of third base portion 296 includes a recessed portion (not shown) extending into third base side 328 and toward stator inner side 130. In the exemplary embodiment, recessed portion (not shown) is configured to couple to second fastener clip (not shown) of rotor housing 108. Moreover, third base side 354 of sixth base portion 302 includes a recessed portion 362 extending into third base side 354 and toward stator inner side 130. In the exemplary embodiment, recessed portion 362 is configured to couple to first fastener clip 126 of rotor housing 108. Alternatively, recessed portion 362 may be arranged in base ends 308, 318, 328, and 346. Recessed portion 362 may be arranged in any location with respect to stator housing 110 to enable coupling between rotor housing 108 and stator housing 110.

Figure 8:
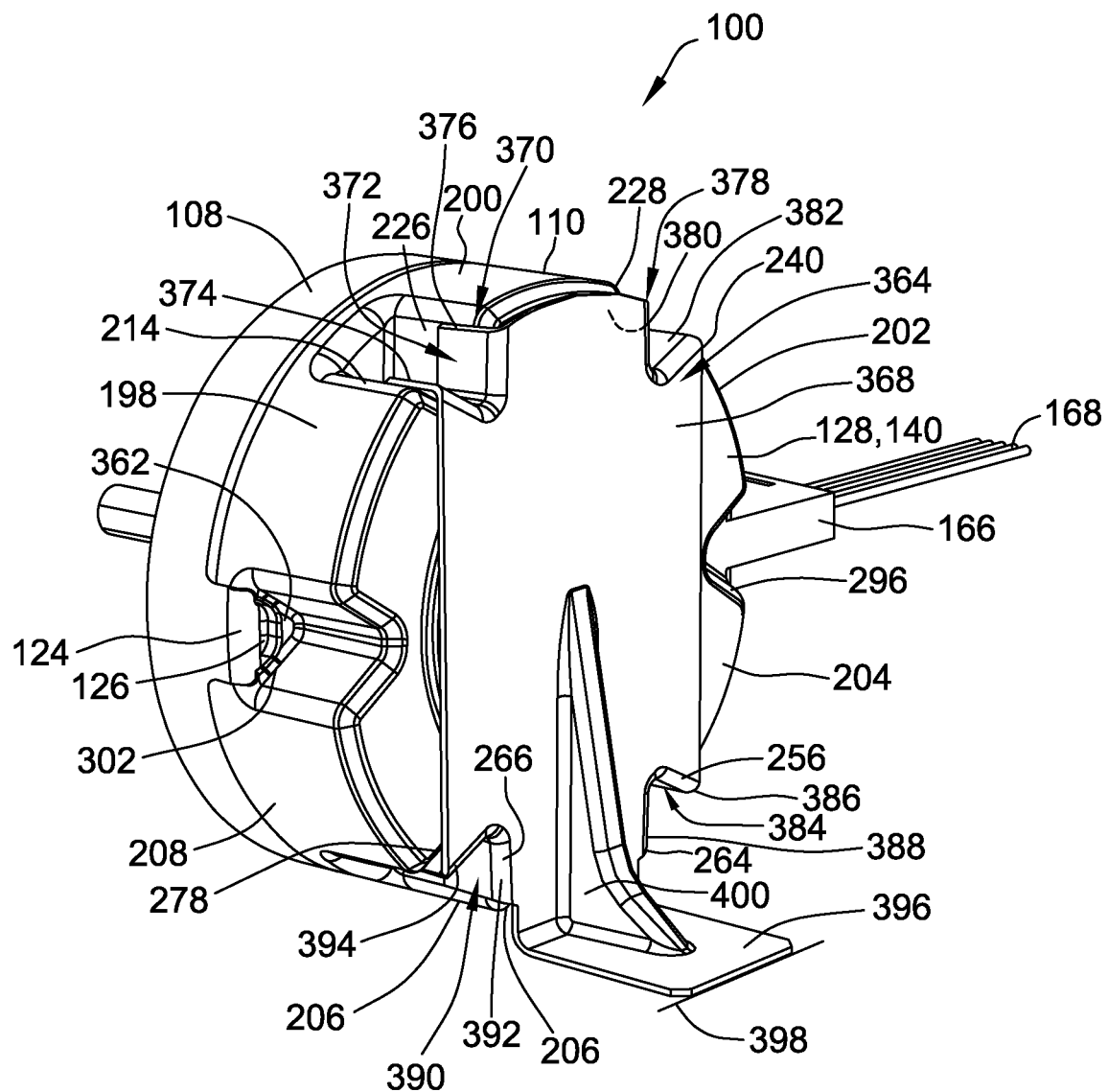
FIG. 8 is a perspective view of an exemplary support coupled to the stator housing shown in FIG. 6.
Figure 9:
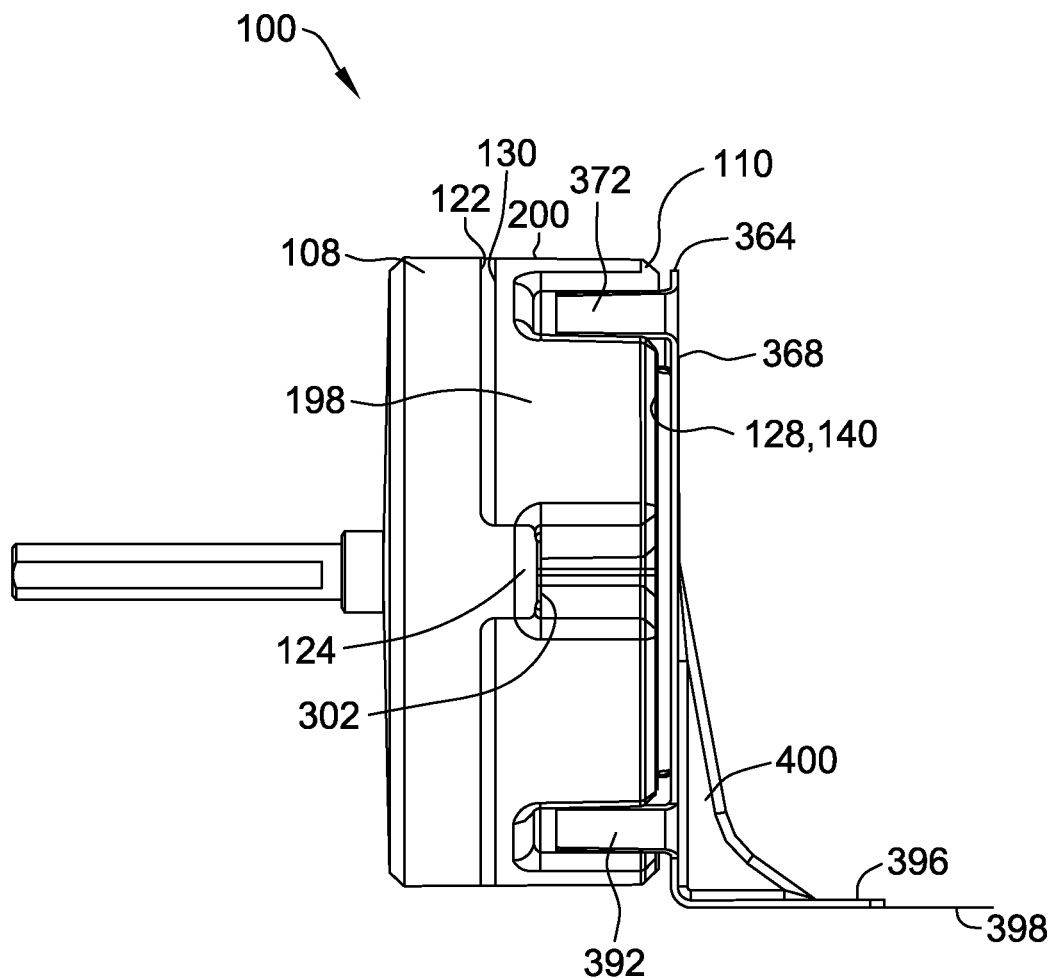
FIG. 9 is a side elevational view of the support and the stator housing shown in FIG. 8.
Figure 10:
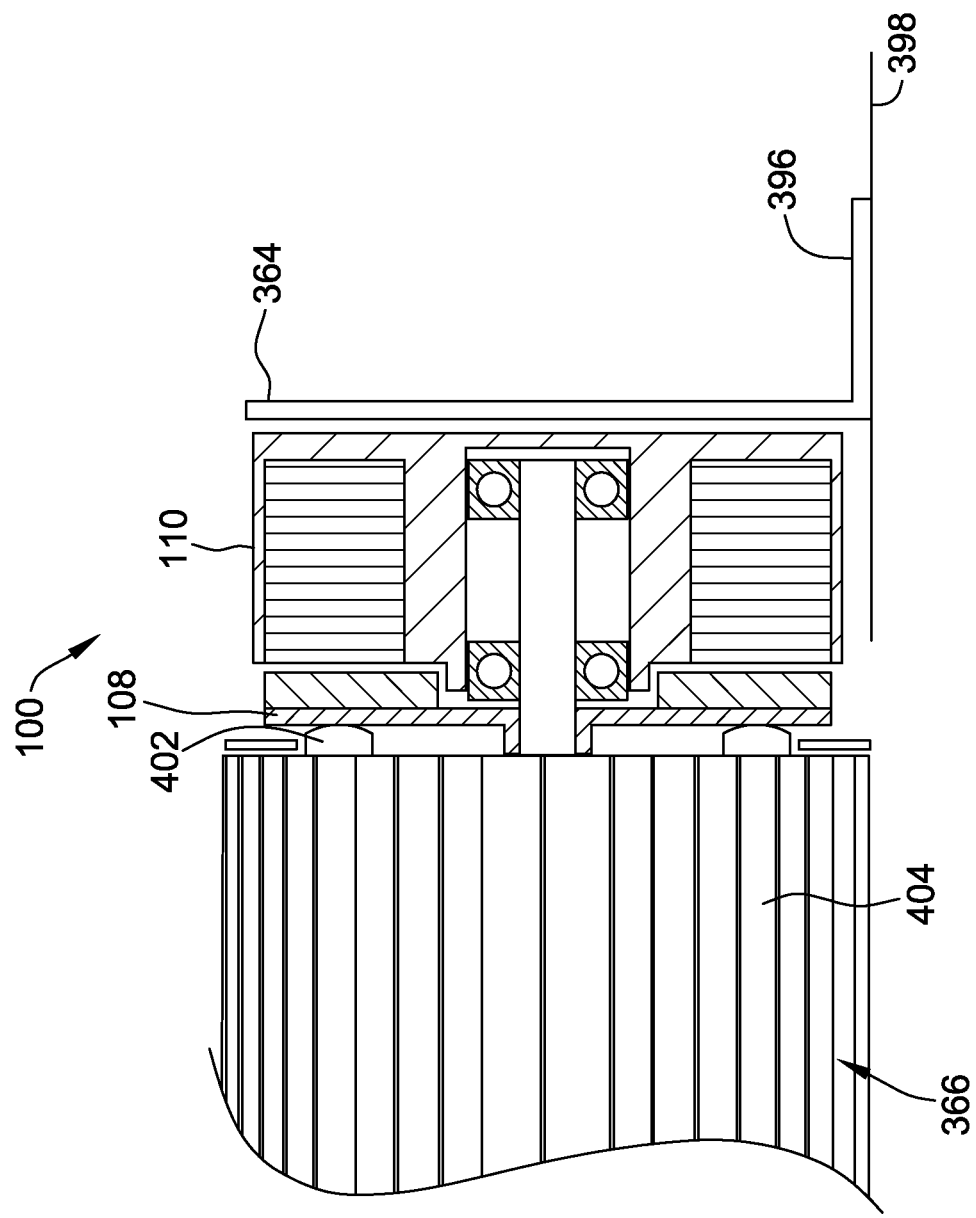
FIG. 10 is a cross-sectional view of an exemplary fan coupled to the electrical machine shown in FIGS. 1 and 2.

FIG. 8 is a perspective view of a support 364 coupled to stator housing 110. FIG. 9 is a side elevational view of support 364 and stator housing 110. FIG. 8 is a cross-sectional view of a fan 366 coupled to electrical machine 100. Rotor inner side 122 couples to stator inner side 130. Moreover, rotor fastener 124 aligns with and pressurably inserts into recessed portion 362 to facilitate coupling rotor housing 108 to stator housing 110. V-shaped sides 308, 318, 328, 338, 346, and 354 are configured to provide areas for recessed portions 362 while minimizing wall thickness for stator housing 110. More particularly, first clip 126 pressurably couples to recessed portion 362 of sixth base portion 302 and second clip (not shown in FIG. 7) pressurably couples to recessed portion (not shown) of third base portion 296.

In the exemplary embodiment, support 364 couples to stator housing 110. In particular, a heat transfer plate 368 couples to flat surface 140 of stator outer surface 132. Heat transfer plate 368 is made from heat transfer materials such as, for example, metal. Alternatively, heat transfer plate 368 may include any material that facilitates heat transfer from stator outer side 128 and to surrounding environment 223. Flat surface 140 is configured to increase surface contact between stator outer side 128 and heat transfer plate 368 to facilitate increasing heat transfer capabilities from stator outer side 128 to environment 322.

Heat transfer plate 368 includes a plurality of fasteners 370 configured to couple to the plurality of module portions 194. In the exemplary embodiment, fastener 370 includes a first tab 372 that is pressurably coupled to first module portion 198 and second module portion 200. In particular, a first tab side 374 is coupled to second module side 214 and a second tab side 376 couples to first module side 226. Fastener 370 includes a second tab 378 that is pressurably coupled to second module portion 200 and third module portion 202. In particular, a first tab side 380 couples to second module side 228 (shown in FIG. 7) and second tab side 382 couples to first module side 240. Fastener 370 includes a third tab 384 that is pressurably coupled to fourth module portion 204 and fifth module portion 206. In particular, a first tab side 386 couples to second module side 256 and a second tab side 388 couples to first module side 264. Fastener 370 includes a fourth tab 390 that is pressurably coupled to fifth module portion 206 and sixth module portion 208. In particular, a first tab side 392 couples to second module side 266 and a second tab side 394 couples to first module side 278. Alternatively, tabs 372, 378, 384 and 390 may couple in any arrangement to first module portion 198, second module portion 200, third module portion 202, fourth module portion 204, fifth module portion 206 and/or sixth module portion 208.

Support 364 also includes a mounting plate 396 that is configured to couple to a surface 398 such as, but not limited to, a floor, a beam, and a frame. A bracket 400 couples to heat transfer plate 368 and mounting plate 396 to facilitate supporting heat transfer plate 368. In the exemplary embodiment, support 364 couples to electrical machine 100 to facilitate stabilizing electrical machine 100 with respect to surface 398. Moreover, support 364 is configured to facilitate heat transfer from electrical machine 100, through heat transfer plate 368 and to environment 223. Still further, support 364 is configured to absorb vibrations applied by fan 366 to electrical machine 100. In the exemplary embodiment, rubber impeller mounts 402 couple to fan 366 between rotor housing 108 and a fan impeller 404.

During an exemplary operation of electrical machine 100, electronic control (not shown) sends a control signal (not shown) through control wires 168 and wire connector 166. In response to control signal (not shown), control board 160 energizes stator modules 158 to facilitate rotating rotor 144 and shaft 146 coupled thereto. During operation, stator modules 158 generate heat. Module portions 194 and base portions 290 are contoured and complimentary to the shapes of stator modules 158 with reduced wall thicknesses to facilitate heat transfer from stator modules 158 and into surrounding environment 223. Since the module portions 194 and base portions 290 are contoured to the shapes of stator modules 158, module portions 194 and base portions 290 are configured to form indentation areas 310, 320, 330, 340, 348, and 356 near stator modules 158 to facilitate heat transfer to the indentation areas 310, 320, 330, 340, 348, and 356. Moreover, during an exemplary operation of electrical machine 100, heat transfer plate 368 of support 364 is coupled to flat surface 140 of stator outer side 128. Flat surface 140 increases the surface contact area with heat transfer plate 368 to facilitate heat transfer from stator modules 158, through stator housing 110 and to heat transfer plate 368. Heat transfer plate 368 transfers the generated heat to surrounding environment 223.

Figure 11:
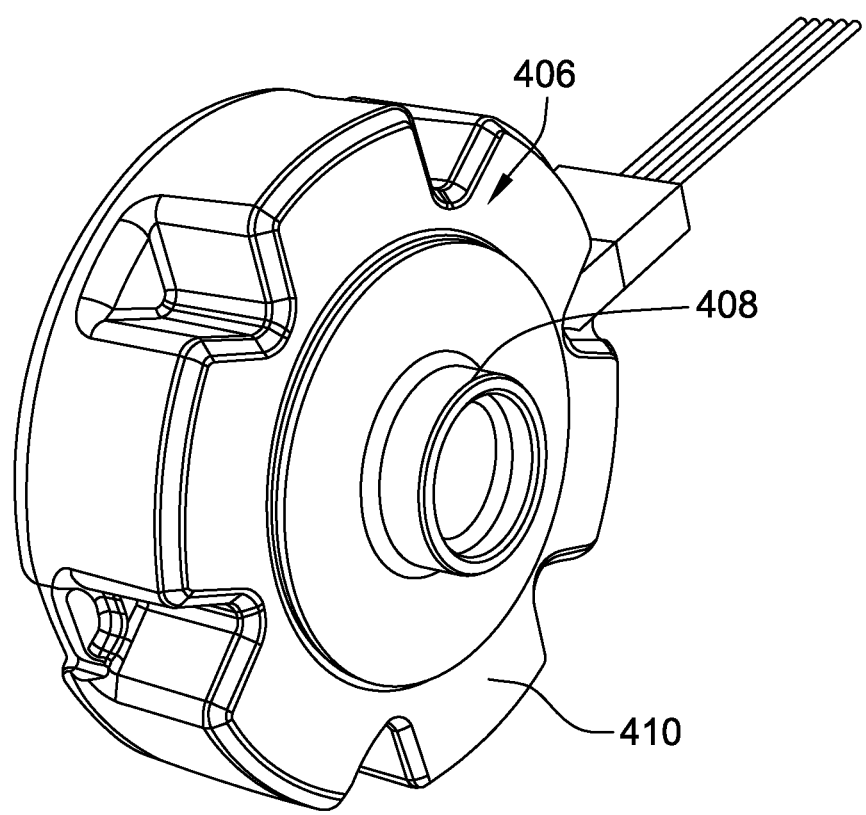
FIG. 11 is a perspective view of another exemplary stator housing.

FIG. 11 is a perspective view of another exemplary stator housing 406. Stator housing 406 includes a bearing housing 408 coupled to stator outer side 410. Bearing housing 408 facilitates coupling electrical machine 100 as a "drop-in" replacement for an existing electrical machine (not shown). More particularly, bearing housing 408 is configured to house an existing bearing assembly (not shown) when electrical machine 100 replaces existing electrical machine (not shown).

Figure 12:
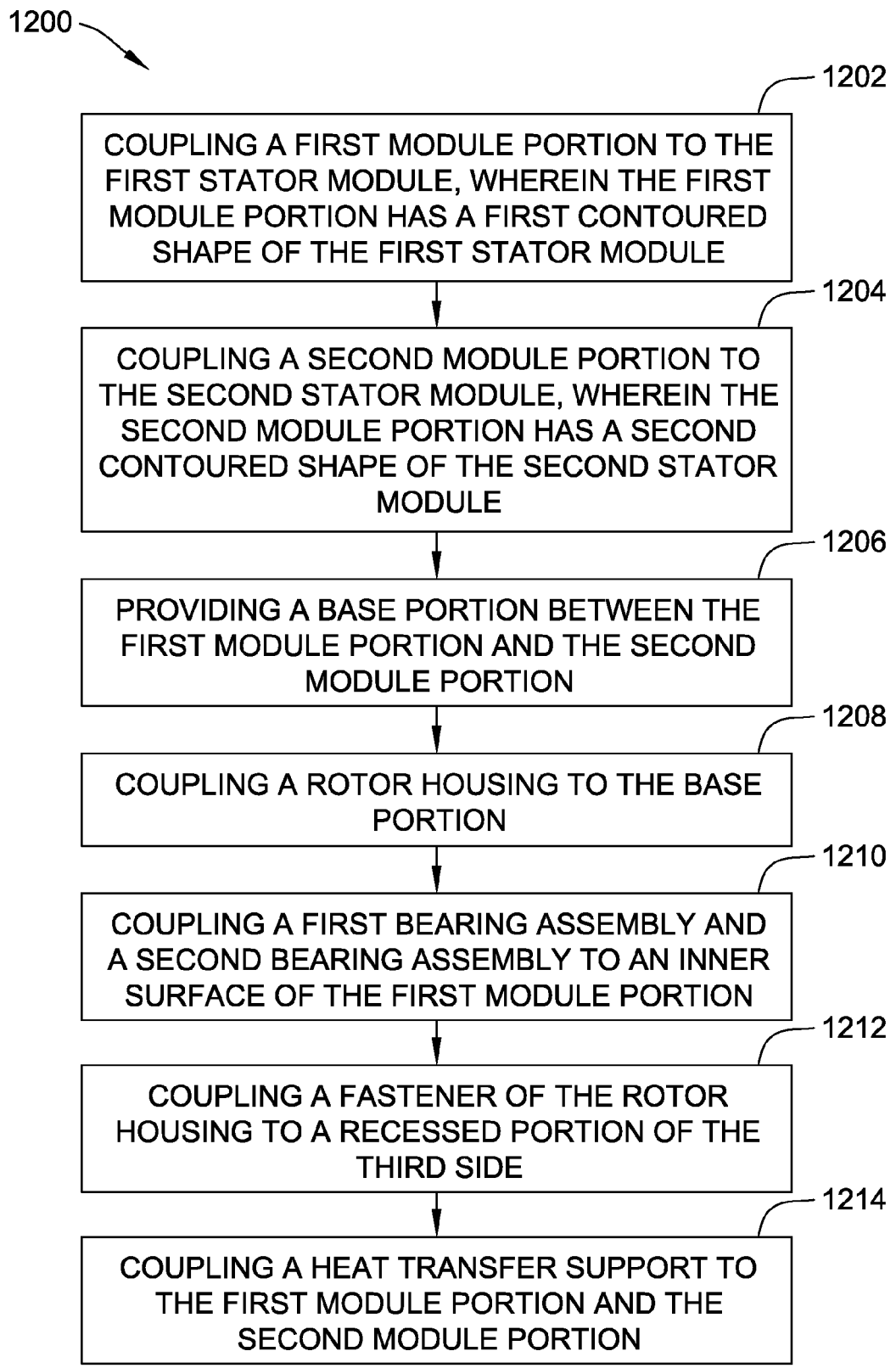
FIG. 12 illustrates an exemplary flowchart illustrating a method of assembling a motor housing.

FIG. 12 illustrates an exemplary flowchart illustrating a method 1200 of assembling a motor housing, for example motor housing 102 (shown in FIG. 1), for an electrical machine, such as a machine 100 (shown in FIG. 1). Method 1200 includes coupling 1202 a first module portion, for example first module portion 198 (shown in FIGS. 6 and 7), to a first stator module, such as first module portion 198 (shown in FIGS. 6 and 7). In the exemplary method 1200, the first module portion has a first contoured shape, for example first contoured shape 210 (shown in FIG. 6), of the first stator module.

Method 1200 includes coupling 1204 a second module portion, for example second module portion 200 (shown in FIGS. 6 and 7), to a second stator module, such as second stator module (shown in FIGS. 6 and 7). In the exemplary method 1200, the second module portion has a second contoured shape 224, for example second contoured shape (shown in FIG. 6), of the second stator module. Method 1200 also includes providing 1206 a base portion, such as base portion 292 (shown in FIGS. 6 and 7), between the first module portion and the second module portion. A rotor housing, for example rotor housing 108 (shown in FIG. 8), is coupled 1208 to the base portion.

In the exemplary method 1200, a first bearing assembly 116, for example first bearing assembly 116 (shown in FIG. 1), and a second bearing assembly, for example second bearing assembly (shown in FIG. 1) is coupled 1210 to an inner surface, such as inner surface 134 (shown in FIG. 1), of the first module portion. Method 1200 includes coupling 1212 a fastener, for example fastener 124 (shown in FIG. 8), of the rotor housing to a recessed portion, for example recessed portion 360 (shown in FIG. 6) of the third side. Method 1200 also includes coupling 1214 a heat transfer support, for example heat transfer support 364 (shown in FIG. 8), to the first module portion and the second module portion.

A technical effect of the systems and methods described herein includes at least one of: (a) contouring a plurality of stator modules of an electrical machine with a plurality of module portions, (b) coupling the module portions to the stator modules, (c) reducing a housing wall thickness around the stator modules, (d) decreasing heat transfer from the plurality of stator modules to surrounding environment, (e) reducing an axial length of an electrical machine, and (f) increasing the efficiency and power density of the electrical machine and decreasing manufacturing, operating, maintenance and replacement costs for the electrical machine.

The exemplary embodiments described herein facilitate thermal efficiency of electrical machines by increasing heat transfer from heat generating components such as, for example, stator modules. More particularly, the embodiments described herein reduce a housing wall thickness near the stator modules. The embodiments described herein contour the stator modules with module portions and couple the module portions to the stator modules. The module portions increase thermal efficiency by reducing the housing wall thickness. Moreover, the module portions reduce an axial length of the electrical machines. Further, the module portions are configured to increase the efficiency and power density and decrease manufacturing, operating, maintenance and replacement costs for the electrical machine. The embodiments described herein further increase heat transfer capabilities by coupling a heat transfer support to the electrical machine.

Exemplary embodiments of a motor housing and methods for assembling the motor housing are described above in detail. The methods and systems are not limited to the specific embodiments described herein, but rather, components of systems and/or steps of the methods may be utilized independently and separately from other components and/or steps described herein. For example, the methods may also be used in combination with other manufacturing systems and methods, and are not limited to practice with only the systems and methods as described herein. Rather, the exemplary embodiment can be implemented and utilized in connection with many other heat generating applications. The dimensional ranges for thicknesses 222, 236, 250, 260, 274, 288, 312, 322, 332, 341, 349, and 358 are exemplary and include sub ranges in between. Moreover, thicknesses 222, 236, 250, 260, 274, 288, 312, 322, 332, 341, 349, and 358 may include any dimension to enable stator hosing 110 to function as described herein.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor housing for enclosing a first stator module and a second stator module of a motor, said motor housing comprising:
   a stator housing comprising:
      a first module portion coupled to the first stator module, said first module portion has a first contoured shape complimentary to the first stator module;
      a second module portion coupled to the second stator module, said second module portion has a second contoured shape complimentary to the second stator module, wherein said second module portion is circumferentially-spaced from said first module portion; and a base portion positioned circumferentially between said first module portion and said second module portion, said base portion comprising a first side coupled to said first module portion and a second side coupled to said second module portion, said base portion further comprising a third side coupled to and extends between said first side and said second side; and a rotor housing coupled to said stator housing and comprising a fastener coupled to said third side.

2. The motor housing of claim 1, wherein said stator housing further comprises a third module portion, said first module portion, said second module portion, and said third module portion are circumferentially arranged about said stator housing.

3. The motor housing of claim 1, wherein said base portion has a V-shape.

4. The motor housing of claim 1, wherein said third side comprises a recessed portion.

5. The motor housing of claim 1, wherein said third side comprises a recessed portion and said fastener comprises a clip configured to couple to said recessed portion.

6. The motor housing of claim 1, further comprising a wire connector coupled to said stator housing and located between said first side and said second side.

7. The motor housing of claim 1, further comprising a bearing housing coupled to said stator housing.

8. The motor housing of claim 1, wherein said stator housing comprises an exterior side having a first end, a second end, and a continuous, flat surface between said first end and said second end.

9. The motor housing of claim 1, further comprising a heat transfer plate coupled to said stator housing.

10. The motor housing of claim 1, wherein said first side, said second side, and said third side each have a wall thickness from about 0.0004 inches to about 0.2 inches.

11. A motor having an axis of rotation, said motor comprising:
   a stator comprising a first stator module and a second stator module;
   a rotor coupled to said stator;
   a motor shaft coupled to said rotor along the axis of rotation; and
   a stator housing coupled to the stator and comprising:
      a first module portion coupled to the first stator module, said first module portion has a first contoured shape complimentary to the first stator module;
      a second module portion coupled to the second stator module, said second module portion has a second contoured shape complimentary to the second stator module, wherein said second module portion is circumferentially-spaced from said first module portion; and
      a base portion positioned circumferentially between said first module portion and said second module portion, said base portion comprising a first side coupled to said first module portion and a second side coupled to said second module portion, said base portion further comprising a third side coupled to and extends between said first side and said second side.

12. The motor of claim 11, wherein said third side comprises a recessed portion.

13. The motor of claim 11, further comprising a support coupled to said stator housing.

14. The motor of claim 11, further comprising a support comprising a first member, a second member and a bracket coupled to said first member and said second member, said first member comprising a heat transfer material.

15. The motor of claim 11, wherein said first stator module comprises an outer surface and an inner surface, said inner surface defining a bore around the axis of rotation.

16. The motor of claim 15, further comprising a first bearing assembly and a second bearing assembly coupled to said inner surface.

17. A method of assembling a motor housing for enclosing a first stator module and a second stator module, said method comprising:
   coupling a first module portion to the first stator module, the first module portion having a first contoured shape complimentary to the first stator module;
   coupling a second module portion to the second stator module, the second module portion having a second contoured shape complimentary to the second stator module;
   positioning the first module portion circumferentially adjacent the second module portion;
   positioning a base portion circumferentially between the first module portion and the second module portion; and
   coupling a rotor housing to the base portion.

18. The method of claim 17, further comprising coupling a heat transfer support to the first module portion and the second module portion.

19. The method of claim 17, further comprising coupling a fastener of the rotor housing to a recessed portion of the third side.

20. The method of claim 17, further comprising coupling a first bearing assembly and a second bearing assembly to an inner surface of the first module portion.

* * * * *